United States Patent [19]
Stanevich

[11] Patent Number: 5,755,526
[45] Date of Patent: May 26, 1998

[54] BALL AND SOCKET JOINT

[75] Inventor: Kenneth Stanevich, De Kalb, Ill.

[73] Assignee: TRW Inc., Lyndhurst, Ohio

[21] Appl. No.: 651,265

[22] Filed: May 23, 1996

[51] Int. Cl.$^6$ ..................................................... F16C 11/06
[52] U.S. Cl. .......................... 403/122; 403/114; 403/315; 248/481
[58] Field of Search .................................. 403/122, 114, 403/115, 76, 90, 315, 319, 316; 248/481, 484

[56] References Cited

U.S. PATENT DOCUMENTS

| | | | |
|---|---|---|---|
| 1,664,893 | 4/1928 | Meyering | 403/115 |
| 3,146,008 | 8/1964 | George | 403/76 X |
| 3,795,922 | 3/1974 | Herbert et al. | 403/76 X |
| 3,803,685 | 4/1974 | Muhn | 403/76 X |
| 4,338,038 | 7/1982 | Cloarec | 403/76 X |
| 5,360,282 | 11/1994 | Nagengast et al. | 403/122 X |
| 5,486,174 | 1/1996 | Fournet-Fayard et al. | 403/122 X |

FOREIGN PATENT DOCUMENTS

| | | | |
|---|---|---|---|
| 569470 | 1/1959 | Canada | 403/115 |

*Primary Examiner*—Harry C. Kim
*Attorney, Agent, or Firm*—Tarolli, Sundheim, Covell, Tummino & Szabo

[57] ABSTRACT

A ball and socket joint (10) includes a socket (20) having a chamber (120). A ball stud (40) includes a ball end (50). The ball end (50) is movable relative to the socket (20) in a first direction (186) into the chamber (120) in the socket. The socket (20) has first portions (142, 144, 152, 154) engageable with the ball end (50) for blocking rotation of the ball end about a first axis (56) during movement of the ball end into the chamber (120). A resilient retainer (180) is deflected during movement of the ball end (50) into the chamber (120). When the ball end (50) is in the chamber (120), the retainer (180) straightens to rotate the ball end into an operating position in the chamber. The socket (20) has second portions (130, 146, 162, 166) engageable with the ball end (50) for blocking movement of the ball end out of the chamber (120) when the ball end is in the operating position. The engagement of the retainer (180) in a retainer opening (100) in the socket (20) blocks rotation of the ball end (50) out of the operating position.

14 Claims, 4 Drawing Sheets

BALL AND SOCKET JOINT

BACKGROUND OF THE INVENTION

1. Technical Field

The present invention relates to a ball and socket joint which is part of a control assembly for controlling an electrically operated device in a vehicle, such as an outside rear view mirror.

2. Description of the Prior Art

It is known to use a manually operable control assembly for controlling an electrically operated device in a vehicle, such as an outside rear view mirror. The control assembly includes a ball and socket joint in which the ball is movable relative to the socket, upon manual engagement by an occupant of the vehicle, to electrically actuate the mirror for movement between a plurality of orientations about two different axes. A ball and socket joint for this application should be difficult to disassemble when mounted in the vehicle.

SUMMARY OF THE INVENTION

The present invention is a ball and socket joint comprising a socket having a chamber and a ball stud including a ball end. The ball end is movable relative to the socket in a first direction into the chamber in the socket. The socket has first portions engageable with the ball end for blocking rotation of the ball end about a first axis during movement of the ball end into the chamber. The ball and socket joint includes means for rotating the ball end in the chamber relative to the socket about the first axis after the ball is located in the chamber into an operating position in which the ball end is rotatable about second and third axes extending transverse to the first axis. The socket has second portions engageable with the ball end for blocking movement of the ball end out of the chamber when the ball end is in the operating position in the chamber.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF PREFERRED EMBODIMENTS

Figure 1:
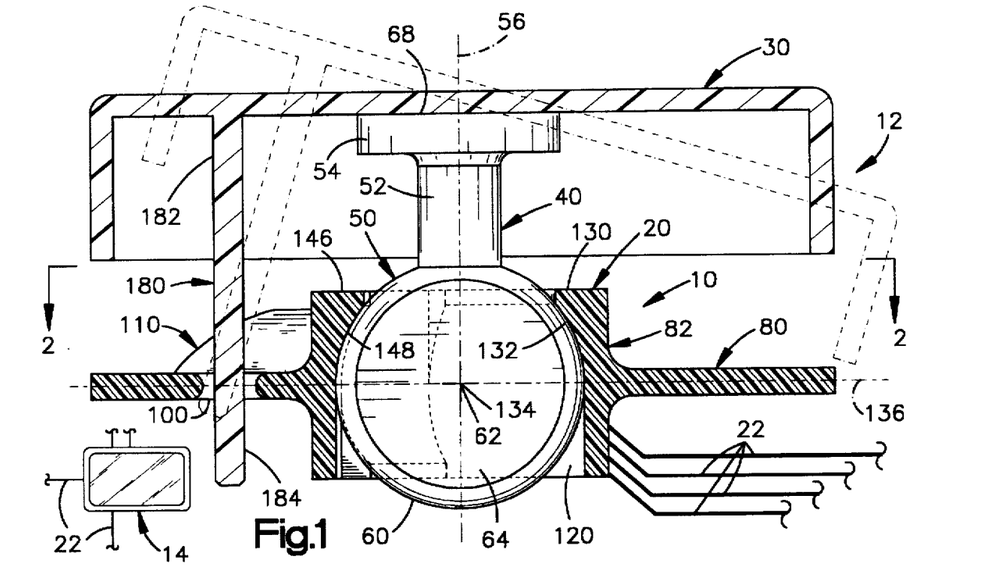
FIG. 1 is a schematic view, partially in section, of a control assembly including a ball and socket joint constructed in accordance with the present invention and taken along line 1—1 of FIG. 2.

The present invention relates to a ball and socket joint which is part of a manually operable control assembly for controlling an electrically operated device in a vehicle, such as an outside rear view mirror. As representative of the present invention, FIG. 1 illustrates a ball and socket joint 10 which is part of a control assembly 12 for controlling an electrically operated mirror 14 of a vehicle.

The ball and socket joint 10 includes a socket 20 which is fixed in the vehicle in a manner not shown. A plurality of lead wires 22 extend between the ball and socket joint 10 and the mirror 14. A manually engageable member in the form of a cap 30 is attached to a ball stud 40 for movement with the ball stud. The lead wires 22 are connected in a known manner with electrical contacts (not shown) in the ball and socket joint 10, so that movement of the ball stud 40 relative to the socket 20, in a manner described below, causes electric current to flow through the lead wires to control the positioning of the mirror 14 in a known manner.

The ball stud 40 (FIG. 5) is molded as one rigid piece from plastic or from metal. The ball stud 40 includes a ball end 50, a shank 52, and a button 54 which are all centered on a longitudinal central axis 56 of the ball stud 40. The axis 56 forms a central axis of the ball and socket joint 10 when the ball stud 40 is assembled with the socket 20.

The ball end 50 is configured as a portion of a sphere having opposite sides cut off along parallel planes. Specifically, the ball end 50 has an external bearing surface 60 which is configured as a portion of a spherical surface centered on a center point 62 (FIG. 1) of the ball end. The center point 62 is disposed on the axis 56. First and second planar side surfaces 64 and 66 (FIG. 2) of the ball end 50 extend parallel to each other and to the axis 56. The side surfaces 64 and 66 of the ball end 50 are equidistant from the center point 62 and are spaced apart from each other by a predetermined distance.

The shank 52 (FIG. 5) of the ball stud 40 is fixed for movement with the ball end 50. The shank 52 has a cylindrical configuration centered on the axis 56. The button 54 has a disc-shaped configuration centered on the axis 56 and is fixed for movement with the shank 52. An upper end surface 68 of the button 54 extends perpendicular to the axis 56.

The socket 20 is molded as one rigid piece from a plastic material such as DuPont Delrin® brand thermoplastic. The socket 20 (FIG. 3) includes a socket wall 82 and an annular mounting flange 80 which extends radially outward from the socket wall. The mounting flange 80 has planar upper and lower side surfaces 84 and 86 which extend parallel to each other and perpendicular to the axis 56. The mounting flange 80 is connected with the vehicle in a known manner (not shown) to secure the ball and socket joint 10 in the vehicle.

A retainer opening 100 (FIG. 5) is formed in the mounting flange 80 of the socket 20. The retainer opening 100 has a circular cross-sectional configuration. The retainer opening 100 extends axially through the mounting flange 80, between the upper and lower side surfaces 84 and 86 of the mounting flange.

A circumferentially extending cam member 110 (FIGS. 4 and 5) is formed on the mounting flange 80 of the socket 20. The cam member 110 has a cam surface 112 which is presented generally away from the mounting flange 80, that is, in an upward direction as viewed in FIGS. 4 and 5. The cam surface 112 slopes toward the retainer opening 100 and terminates at the retainer opening. The cam member 110 has a circumferential extent of 45 degrees about the axis 56.

The socket wall 82 (FIG. 3) of the socket 20 defines a chamber 120 in the socket. The socket wall 82 has a generally cylindrical, tubular configuration. The socket wall 82 includes a cylindrical main body 122 having a generally cylindrical inner surface 124 which is centered on the axis 56. An upper portion 126 of the socket wall 82 projects above the mounting flange 80 as viewed in FIG. 3. A lower portion 128 of the socket wall 82 projects below the mounting flange 80 as viewed in FIG. 3.

A first upper lip 130 (FIGS. 2 and 5) of the socket 20 extends radially inward from the upper portion 126 of the socket wall 82. The first upper lip 130 has an internal bearing surface 132 (FIGS. 1 and 5) which is formed as a portion of a spherical surface having the same diameter as the spherical external bearing surface 60 of the ball end 50. The bearing surface 132 on the first upper lip 130 is centered on a center point 134 of the socket 20. The center point 134 (FIG. 1) is disposed on the axis 56. The center point 134 of the socket 20 lies in an imaginary plane 136 extending through the mounting flange 80 at a location parallel to and equidistant between the upper and lower side surfaces 84 and 86 of the mounting flange.

The first upper lip 130 has an inner peripheral surface 140 (FIG. 2) which is formed as a portion of an imaginary cylinder centered on the axis 56. The imaginary cylinder has a diameter which is less than the diameter of the spherical external bearing surface 60 of the ball end 50. A pair of planar first guide surfaces 142 and 144 form the circumferential boundaries of the first upper lip 130. The first guide surfaces 142 and 144 lie in a plane which extends parallel to the axis 56.

The socket wall 82 includes a second upper lip 146 (FIG. 2) which is identical in configuration to the first upper lip 130. The second upper lip is disposed diametrically opposite the first upper lip 130 and extends radially inward from the upper portion 126 of the socket wall 82. The second upper lip 146 has an internal bearing surface 148 (FIG. 1) which is formed as a portion of the same spherical surface as is the internal bearing surface 132 on the first upper lip 130. The second upper lip 146 has an inner peripheral surface 150 which is formed as a portion of the same cylinder as is the inner peripheral surface 140 on the first upper lip 130.

The second upper lip 146 is bounded circumferentially by pair of planar second guide surfaces 152 and 154 (FIG. 2) which lie in a plane which extends parallel to the axis 56. The plane of the second guide surfaces 152 and 154 is spaced apart from the plane of the first guide surfaces 142 and 144 by a distance which is equal to or slightly greater than the distance between the side surfaces 64 and 66 of the ball end 50.

The guide surfaces 142, 144, 152 and 154 define an insertion channel or keyway 160 (FIGS. 2, 4 and 5) in the socket 20 through which the ball end 50 is movable into the chamber 120. The provision of the insertion channel 160 in the socket 20 also enables removal of an upper die core (not shown) from the chamber 120, during molding of the socket. The insertion channel 160 is bounded on one side by the plane of the first guide surfaces 142 and 144, on the opposite side by the plane of the second guide surfaces 152 and 154, and on the ends by the portions of the cylindrical inner surface 124 of the socket wall 82 which extend between the first guide surfaces and the second guide surfaces. The insertion channel 160 is oriented relative to the retainer opening 100 (FIG. 2) so that an imaginary plane through the center of the insertion channel, parallel to and equidistant between the guide surfaces 142, 144, 152 and 154, is angularly offset from the retainer opening by 45 degrees about the axis 56.

Figure 3:
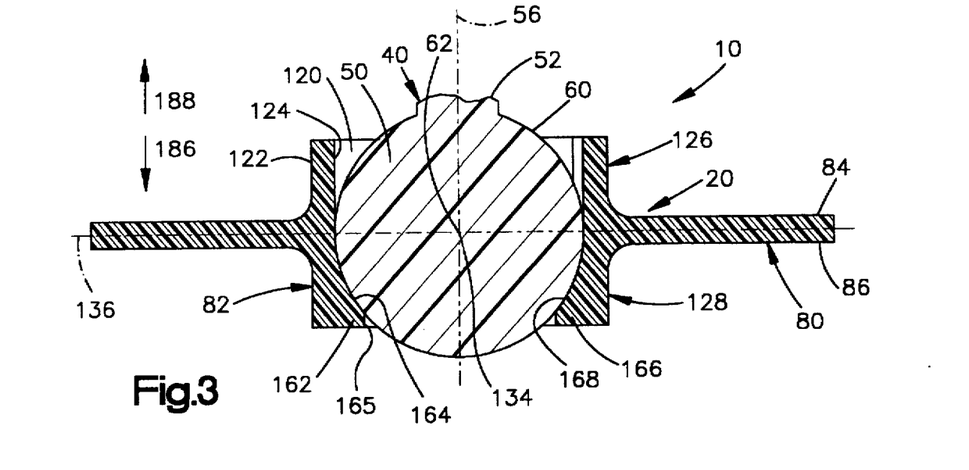
FIG. 3 is a sectional view taken along line 3—3 of FIG. 2.

The lower portion 128 of the socket wall 82 is disposed below the mounting flange 80 as viewed in FIG. 3. The lower portion 128 of the socket wall 82 is angularly offset by 90 degrees from the upper portion 126 about the axis 56. A first lower lip 162 (FIG. 3) of the socket 20 extends radially inward from the lower portion 128 of the socket wall 82. The first lower lip 162 has an internal bearing surface 164 which is formed as a portion of the same spherical surface as are the internal bearing surfaces 132 and 138 on the upper lips 130 and 146, respectively. The first lower lip 162 has an inner peripheral surface 165 which is formed as a portion of the same cylinder as are the inner peripheral surfaces 140 and 150 on the upper lips 130 and 146, respectively.

The socket wall 82 includes a second lower lip 166 which is identical in configuration to and located diametrically opposite the first lower lip 162. The second lower lip 166 extends radially inward from the lower portion 128 of the socket wall 82. The second lower lip 166 has an internal bearing surface 168 which is formed as a portion of the same spherical surface as are the internal bearing surfaces 132, 138 and 164 on the other three lips 130, 146 and 162, respectively. The open space between the lower lips 162 and 166 on the socket 20 enables removal of a lower die core (not shown) from the chamber 120 during molding of the socket.

The cap 30 (FIG. 1) is fixed to the ball stud 40 for movement with the ball stud. Specifically, the upper end surface 68 of the button 54 on the ball stud 40 is secured in a known manner (not shown), such as by adhesive or welding, to the underside of the cap 30. The cap 30 is manually engageable by an occupant of the vehicle on which the control assembly 12 is mounted, to effect movement of the ball stud 40 relative to the socket 20.

A retainer 180 (FIGS. 1, 2 and 4) extends from the underside of the cap 30. The retainer 180 has a cylindrical or rod-like configuration and extends parallel to the axis 56 at a location spaced apart from the ball stud 40. The retainer 180 is disposed a predetermined distance from the axis 56.

Figure 2:
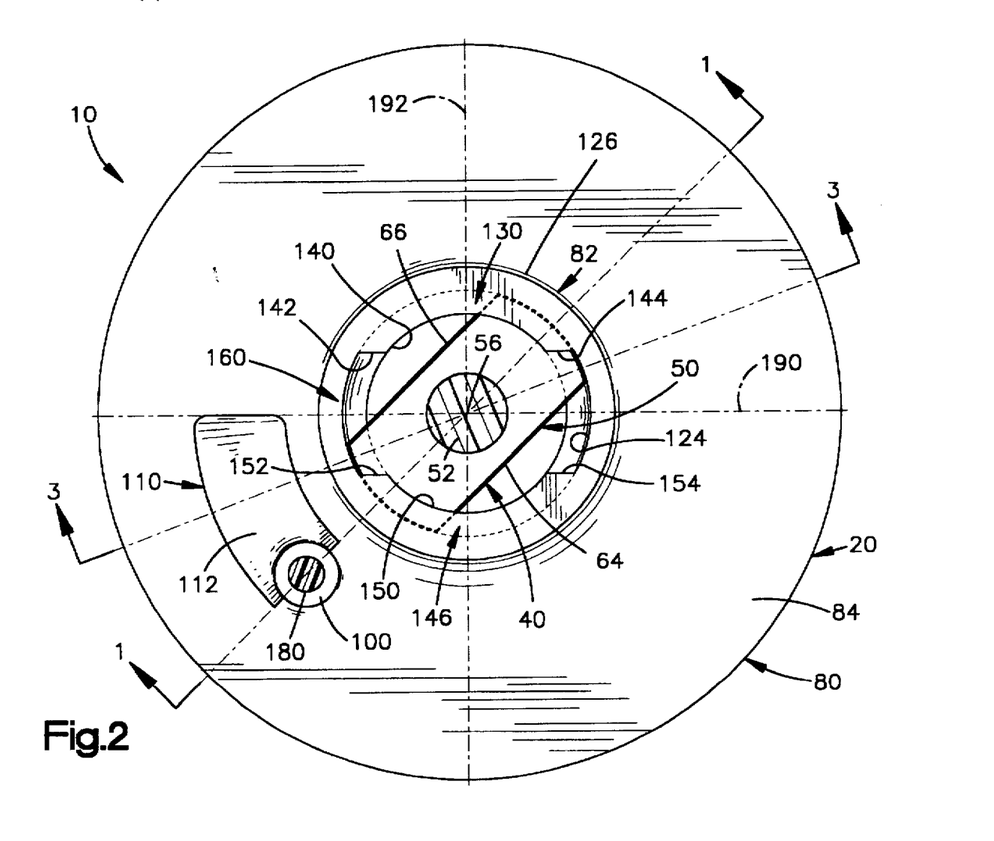
FIG. 2 is a sectional view taken along line 2—2 of FIG. 1.
Figure 4:
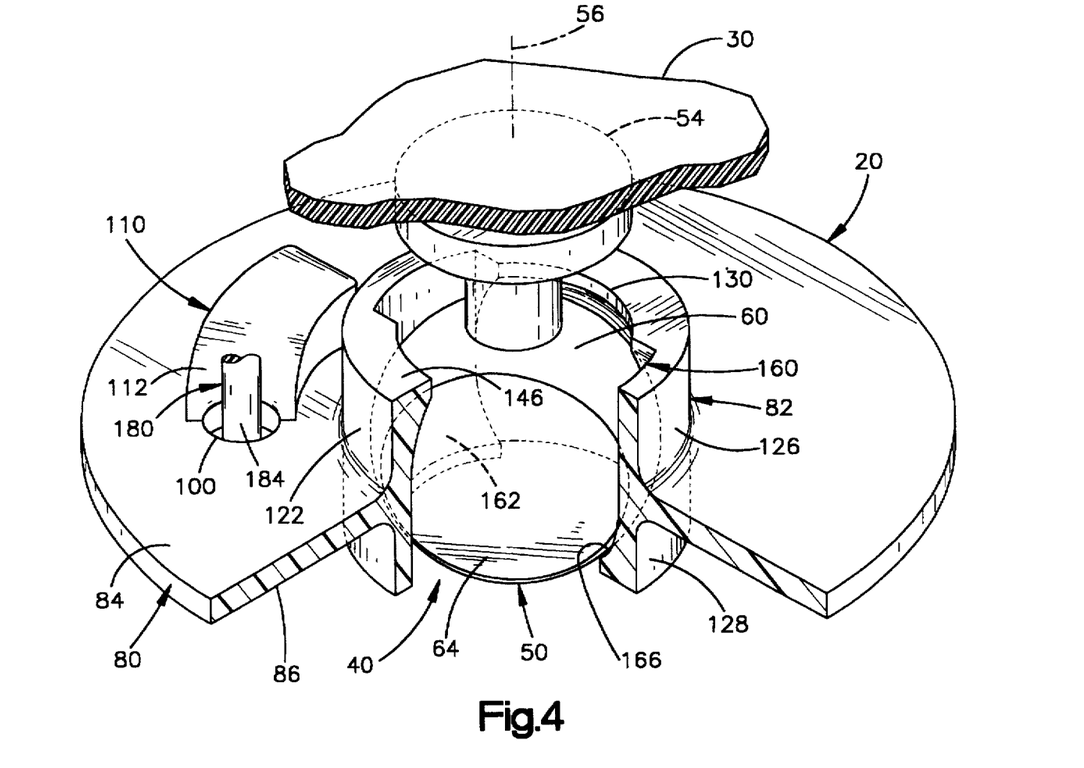
FIG. 4 is a perspective view, partially cut away, showing the ball and socket joint of FIG. 1 in an operating position.

The retainer 180 is made from a resiliently deflectable material. A first end portion 182 of the retainer 180 is fixed for movement with the cap 30 and, thereby, fixed for movement with the ball stud 40. A second end portion 184 of the retainer 180 is spaced apart from the first end portion 182 and is resiliently deflectable relative to the first end portion.

The retainer 180 is shown in the drawings in a free condition and is movable or bendable from the free condition to a deflected condition (not shown). The retainer 180 is movable from the free condition to the deflected condition upon the application of a force greater than a predetermined force to the second end portion 184 of the retainer. The retainer 180, when in the deflected condition, has an arcuate configuration and the second end portion 184 is deflected relative to the first end portion 182.

Figure 5:
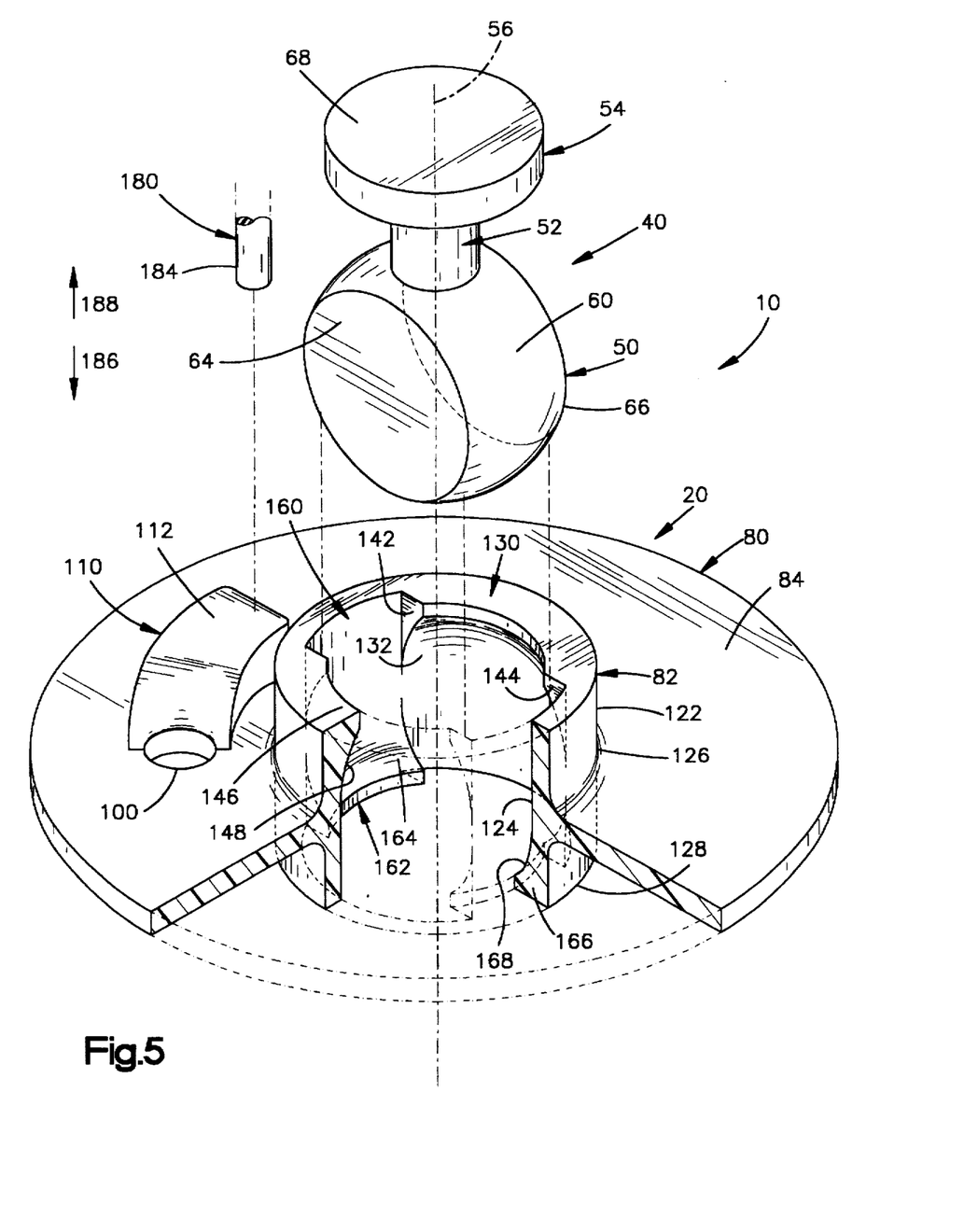
FIG. 5 is an exploded perspective view similar to FIG. 4.

The ball stud 40 is assembled with the socket 20 by moving the ball end 50 in a first direction as indicated by the arrow 186 into the open upper end of the socket between the upper lips 130 and 146, that is, in a downward direction as viewed in FIG. 5. The first direction 186 extends parallel to the axis 56. During insertion of the ball end 50 into the socket 20, the side surfaces 64 and 66 on the ball end 50 act as a key in the keyway or insertion channel 160 of the socket 20. Specifically, the ball stud 40 is oriented relative to the socket 20 so that the side surface 66 on the ball end 50 engages the guide surfaces 142 and 144 on the socket, and the side surface 64 on the ball end engages the guide surfaces 152 and 154 on the socket. This engagement prevents the ball end 50 from rotating relative to the socket 20, about the axis 56, while the ball end is being moved axially into the socket in the first direction 186.

While the ball end 50 is being moved axially into the socket 20, the cap 30 including the retainer 180 is moving, in the first direction 186, toward the mounting flange 80. During this movement, the second end portion 184 of the retainer 180 engages the cam surface 112 on the socket 20 at a position angularly offset from the retainer opening 100 by 45 degrees about the axis 56.

Continued movement of the retainer 180 and the cap 30 in the first direction 186 results in the application of force to the second end portion 184 of the retainer in an amount greater than the predetermined amount. The cam surface 112 on the socket 20 deflects the second end portion 184 of the retainer 180. The retainer 180 deflects relative to the shank 52 and to the ball end 50. The work which is performed in deflecting the retainer 180 is stored in the ball and socket joint 10 as potential energy in the resilient material of the retainer. The resistance to bending of the retainer 180 manifests itself as torque which attempts to produce relative rotation about the axis 56 between the retainer and the ball end 50. However, the engagement between the side surfaces 64 and 66 on the ball end 50 and the guide surfaces 142, 144, 152 and 154 on the socket 20 temporarily prevents such relative rotation.

When the ball end 50 is moved far enough into the socket 20, that is, at a predetermined axial location relative to the socket, the center point 62 of the ball end coincides with the center point 134 of the socket. The parts of the ball and socket joint 10 are in an assembly position. When the parts of the ball and socket joint 10 are in this assembly position, the second end portion 184 of the retainer 180 becomes angularly aligned with the retainer opening 100 in the socket 20. The second end portion 184 of the retainer 180 enters into the retainer opening 100.

At about this same time, the side surfaces 64 and 66 on the ball end 50 disengage from the guide surfaces 142, 144, 152 and 154 on the socket 20. As a result, the ball end 50 is no longer prevented from rotating within the chamber 120 about the axis 56. The potential energy which is stored in the resiliently deflected retainer 180 is released and results in relative rotation about the axis 56 between the retainer and the ball end 50. The engagement of the retainer 180 in the retainer opening 100 prevents the retainer from rotating by more than a few degrees relative to the socket 20 about the axis 56. Therefore, the ball end 50 rotates relative to the retainer.

Specifically, the ball end 50, and the shank 52, rotate relative to the socket 20 about the axis 56, in a counterclockwise direction as viewed in FIG. 2. The ball end 50, and the ball stud 40 as a whole, rotate 45 degrees about the axis 56 from the assembly position to an operating position as shown in FIGS. 2 and 4. The retainer 180 stays in the retainer opening 100 and returns to its free (straightened) condition as a result of the rotation of the ball end 50.

When the ball end 50 of the ball stud 40 is in the operating position, the spherical external bearing surface 60 on the ball end is in sliding engagement with the spherical internal bearing surfaces 132 and 148 (FIG. 1) on the first and second upper lips 130 and 146, respectively, on the socket 20. The spherical external bearing surface 60 on the ball end 50 is also in sliding engagement with the spherical internal bearing surfaces 164 and 168 on the first and second lower lips 162 and 166, respectively, on the socket 20. The engagement between the external bearing surface 60 on the ball end 50 and the internal bearing surfaces 132, 148, 164 and 168 (FIG. 3) on the socket 20 supports the ball end 50 for rotation in the chamber 120 in the socket. The ball stud 40 is thus supported for pivotal movement relative to the socket 20.

When the ball end 50 is in the operating position, the ball end 50 is rotatable relative to the socket 20, in the chamber 120, about a second axis 190 (FIG. 2) extending through the center point 134 of the socket 20. The second axis 190 extends perpendicular to the first axis 56. When the ball end 50 is in the operating position, the ball end 50 also is rotatable relative to the socket 20, in the chamber 120, about a third axis 192 extending through the center point 134 of the socket 20. The third axis 192 extends perpendicular to the first axis 56 and to the second axis 190. These two degrees of rotational movement of the ball end 50 and of pivotal movement of the ball stud 40 provide the necessary operating range for the ball and socket joint 10 to act as a control for the mirror 14.

When the ball end 50 is in the operating position, the engagement of the retainer 180 in the retainer opening 100 prevents the ball end 50 from rotating about the axis 56 relative to the socket from the operating position back to the assembly position. Specifically, unless a rotational force (about the axis 56) in an amount greater than the predetermined amount is applied to the ball stud 40, the retainer 180 does not deflect sufficiently from its free condition to enable rotation of the ball end 50 from the operation position back to the assembly position. The predetermined amount of force is greater than any amount reasonably expected to be applied to the ball stud 40 in the operation of the ball and socket joint 10 when mounted in the vehicle.

Also, the ball end 50 is maintained axially in the socket 20. Specifically, the inner peripheral surfaces on the lips 130, 146, 162 and 166 on the socket 20 are formed as portions of a cylinder having a diameter less than the diameter of the ball end 50. As a result, the lower lips 162 and 166 on the socket 20 prevent the ball end 50 from being moved axially out of the socket, in a second direction 188 opposite to the first direction 186. The upper lips 130 and 146 on the socket 20 prevent the ball end 50 from being moved axially out of the socket in the first direction 186.

Figure 6:
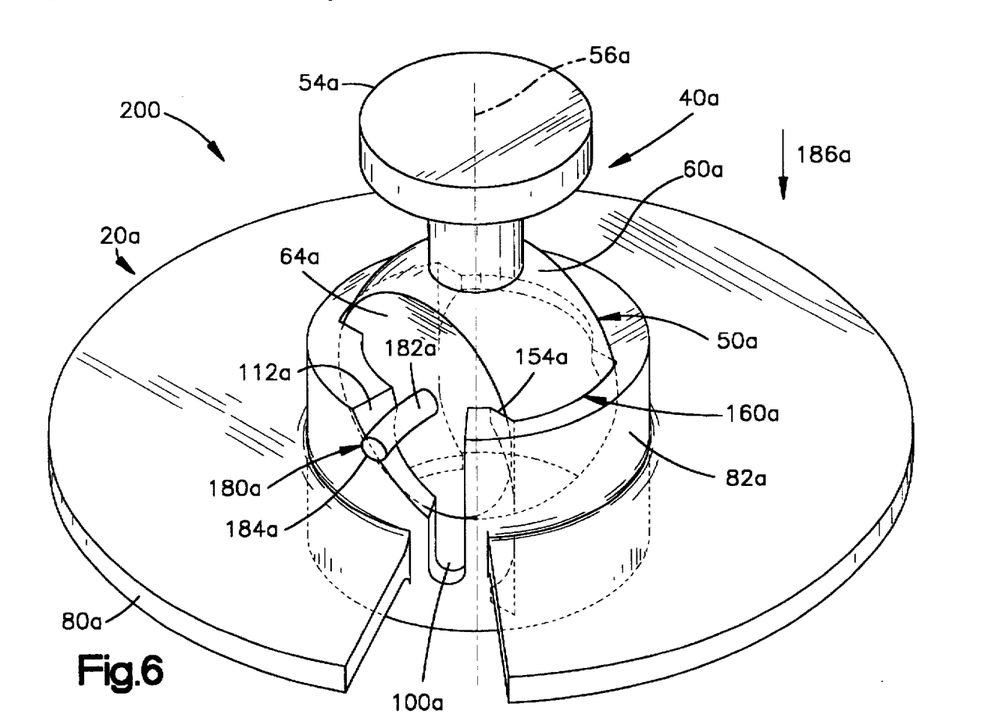
FIG. 6 is a perspective view, partially cut away, of a ball and socket joint which is constructed in accordance with a second embodiment of the present invention.
Figure 7:
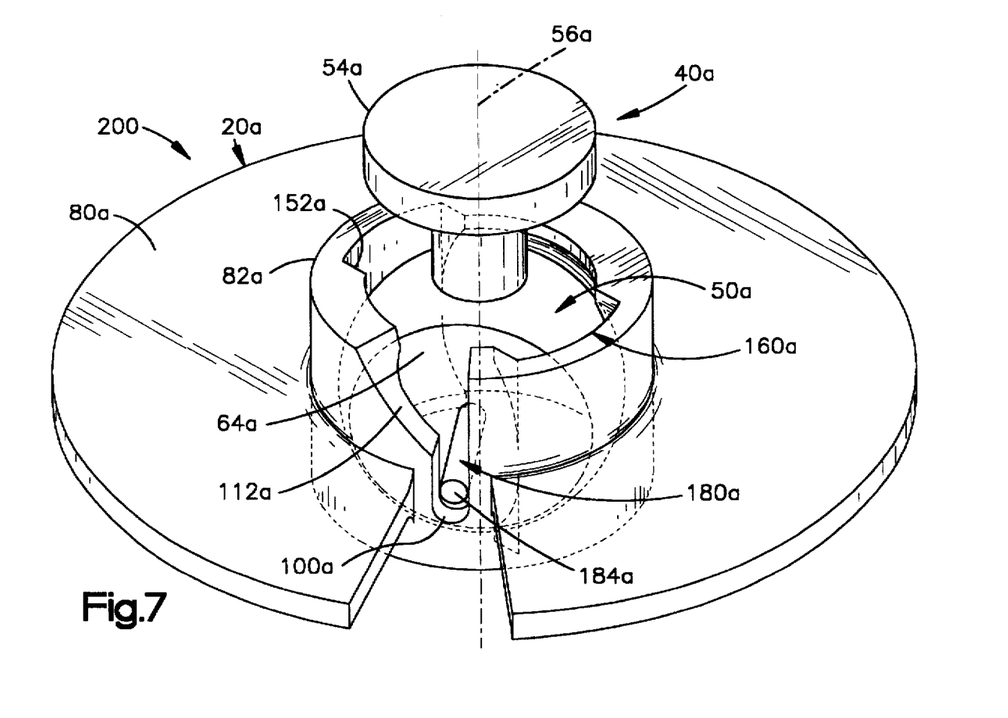
FIG. 7 is a perspective view of the ball and socket joint of FIG. 6 shown in an operating position.

FIGS. 6 and 7 illustrate a ball and socket joint 200 which is constructed in accordance with a second embodiment of the present invention. The ball and socket joint 200 is similar to the ball and socket joint 10 (FIGS. 1–5) and can be substituted for the ball and socket joint 10 in the control assembly 12. Parts of the ball and socket joint 200 which are the same as or similar to corresponding parts of the ball and socket joint 10 are given the same reference numerals with the suffix "a" added for clarity.

The ball and socket joint 200 includes a rigid socket 20a which has an insertion channel 160a. The socket 20a also has a retainer opening in the form of a radially and axially extending slot 100a in the socket wall 82a. The slot 100a is offset angularly, about the axis 56a, by a predetermined number of degrees from the central plane of the insertion channel 160a. In the illustrated embodiment, the slot 100a is offset angularly by about 45 degrees from the central plane of the insertion channel 160a, in a clockwise direction as viewed from above in FIGS. 6 and 7.

A cam surface 112a is formed on the socket wall 82a. The cam surface 112a extends from the top (as viewed in FIG. 6) of the socket wall 82a down to the slot 100a. The cam surface 112a has a circumferential extent of about 45 degrees about the axis 56a.

The ball stud 40a includes a retainer in the form of a resilient post 180a. The ball stud 40 is, otherwise, sufficiently rigid that it does not deform during assembly or operation of the ball and socket joint 200. The post 180a has a first end portion 182a fixed for movement with the ball end 50a and a second end portion 184a which is resiliently deflectable relative to the first end portion. The post 180a extends radially outward from the one side surface 64a of the ball end 50a, in a direction perpendicular to the axis 56a. The post 180a is resiliently deflectable between a free condition as viewed in FIG. 7 and a deflected condition as viewed in FIG. 6. The post 180a has an arcuate configuration when in the deflected condition.

The ball stud 40a is assembled with the socket 20a by moving the ball end 50a in the first direction 186a (downward as viewed in FIGS. 6 and 7) into the insertion channel 160a in the socket. The ball end 50a is moved into the socket 20a in an orientation so that the planar side surfaces on the ball end engage with the guide surfaces on the socket. This engagement prevents the ball end 50a from rotating relative to the socket 20a, about the axis 56a, while the ball end is being moved axially into the socket.

When the ball end 50a enters into the insertion channel 160a in the socket 20a, the post 180a is angularly offset from the slot 100a by 45 degrees about the axis 56a. The second end portion 184a of the post 180a engages the cam surface 112a on the socket 20a. As the ball end 50a is being moved axially into the socket 20a, the cam surface 112a on the socket deflects the post 180a, from its free condition toward a deflected position in which the second end portion 184a of the post is angularly aligned with the slot 100a in the socket wall 82a.

The post 180a deflects relative to the ball end 50a. The resilience of the post 180a attempts to produce relative rotation about the axis 56a between the post 180a and the ball end 50a. However, the engagement of the ball end 50a in the insertion channel 160a temporarily prevents such relative rotation.

When the ball end 50a is moved far enough into the socket 20, that is, at a predetermined axial location relative to the socket, the planar side surfaces on the ball end 50a disengage from the planar guide surfaces which form the insertion channel 160a in the socket. At about this same time, the second end portion 184a of the post 180a becomes angularly aligned with the slot 100a in the socket 20a. The second end portion 184 of the post 180a enters into the slot 100a. The engagement of the post 180a in the slot 100a prevents the post from rotating by more than a few degrees relative to the socket 20a about the axis 56a. The parts of the ball and socket joint 200 are in an assembly position.

The potential energy which is stored in the resiliently deflected post 180a is released and results in rotation of the ball end 50a relative to the post 180a, in a counterclockwise direction as viewed in FIGS. 6 and 7. The ball end 50a, and the ball stud 40a as a whole, rotate about the axis 56a from the assembly position shown in FIG. 6 to the operating position shown in FIG. 7. The post 180a stays in the slot 100a and returns to its free condition.

When the ball end 50a of the ball stud 40a is in the operating position, the ball stud is pivotable relative to the socket 20a, about a second axis (not shown) which extends through the center of the ball end 50a and through the center of the mounting flange 80a. The ball stud 40a is also pivotable about a third axis (not shown) which extends through the center of the ball end 50a and perpendicular to the side surface 64a—that is, longitudinally through the post 180. The second axis 190 and the third axis extend perpendicular to each other and to the first axis 56a. These two degrees of pivoting movement provide the necessary operating range for the ball and socket joint 200 to act as a control for the mirror 14.

When the ball end 50a is in the operating position, the engagement of the post 180a in the slot 100a prevents the ball end 50a from rotating in a significant amount about the axis 56a relative to the socket 20a. Thus, the ball end 50a can not be returned from the operating position back to the assembly position. Also, the ball end 50a is maintained axially in the socket 20a in the same manner as the ball end 50 is maintained in the socket 20.

From the above description of the invention, those skilled in the art will perceive improvements, changes and modifications in the invention. For example, the retainer could be formed in a different manner, so long as it is movable with the ball stud 40 relative to the socket 20. Such improvements, changes and modifications within the skill of the art are intended to be covered by the appended claims.

Having described the invention, I claim:

1. A ball and socket joint comprising:

a socket having a chamber; and a ball stud including a ball end;

said ball end being movable relative to said socket in a first direction into said chamber in said socket, said socket having first portions engageable with said ball end for blocking rotation of said ball end about a first axis during movement of said ball end into said chamber;

means for rotating said ball end in said chamber relative to said socket about said first axis after said ball end is located in said chamber into an operating position in which said ball end is rotatable about second and third axes extending transverse to said first axis;

said socket having second portions engageable with said ball end for blocking movement of said ball end out of said chamber when said ball end is in the operating position in said chamber;

wherein said means for rotating said ball end in said chamber into the operating position comprises a resilient member connected with said ball end and movable between a free condition and a deflected condition in response to the application of a force greater than a predetermined force, said resilient member being moved into the deflected condition during movement of said ball end into said chamber, said resilient member returning from the deflected condition to the free condition upon movement of said ball end into the operating position in said chamber, said ball end rotating in said chamber into the operating position in response to movement of said resilient member from the deflected condition to the free condition.

2. A ball and socket joint comprising:

a socket having a chamber; and a ball stud including a ball end;

said ball end being movable relative to said socket in a first direction into said chamber in said socket, said socket having first portions engageable with said ball end for blocking rotation of said ball end about a first axis during movement of said ball end into said chamber;

means for rotating said ball end in said chamber relative to said socket about said first axis after said ball end is located in said chamber into an operating position in which said ball end is rotatable about second and third axes extending transverse to said first axis;

said socket having second portions engageable with said ball end for blocking movement of said ball end out of said chamber when said ball end is in the operating position in said chamber;

said joint further comprising means for blocking rotation of said ball end relative to said socket from the operating position to the assembly position, said means for blocking rotation comprising a retainer having a first end portion fixed for rotation with said ball end about said first axis and a second end portion resiliently deflectable relative to said first end portion between a free condition and a deflected condition in response to the application of a force greater than a predetermined force, said socket having a retainer opening for receiving said second end portion of said retainer when said ball end is in the operating condition to block rotation of said ball end in said chamber from the operating position.

3. An apparatus as set forth in claim 2 wherein said retainer extends parallel to said first axis when in the free condition, said retainer opening extending axially through a radially extending portion of said socket.

4. A ball and socket joint comprising:

a socket having a chamber; and a ball stud including a ball end;

said ball end being movable relative to said socket in a first direction into said chamber in said socket, said socket having first portions engageable with said ball end for blocking rotation of said ball end about a first axis during movement of said ball end into said chamber;

means for rotating said ball end in said chamber relative to said socket about said first axis after said ball end is located in said chamber into an operating position in which said ball end is rotatable about second and third axes extending transverse to said first axis;

said socket having second portions engageable with said ball end for blocking movement of said ball end out of said chamber when said ball end is in the operating position in said chamber;

wherein said ball end has a spherical outer bearing surface with a diameter, said second portions of said socket comprising a plurality of lips on said socket which are spaced apart by a distance which is less than the diameter of said ball end, said lips blocking movement of said ball end out of said chamber in said first direction and in a second direction opposite to said first direction when said ball end is in the operating position in said chamber.

5. An apparatus as set forth in claim 4 wherein said lips at least partially define an insertion channel through which said ball end is movable in said first direction into said chamber;

said insertion channel being angularly offset from said retainer opening by a predetermined number of degrees;

said ball end rotating by said predetermined number of degrees to the operating position;

said retainer moving from the deflected condition to the free condition during rotation of said ball end in said chamber into the operating position.

6. A ball and socket joint comprising:

a socket having a chamber and having a retainer opening;

a ball stud having a first axis and including a ball end centered on said first axis; and a retainer connected for movement with said ball stud, said retainer having a free condition and being resiliently deflectable from the free condition into a deflected condition;

said ball end being movable in a first direction into said chamber in said socket, said socket having portions engageable with said ball end for blocking rotation of said ball end about said first axis during movement of said ball end into said chamber;

cam means on said socket and engageable with said retainer for deflecting said retainer from the free condition into the deflected condition and into said retainer opening during movement of said ball end into said chamber;

said ball end being rotatable in said chamber about said first axis into an operating position in which said ball end is rotatable about second and third axes extending transverse to said first axis;

said retainer on said ball stud returning from the deflected condition to the free condition during rotation of said ball end in said chamber into the operating position;

said socket having portions engageable with said ball end for blocking axial movement of said ball end out of said chamber when said ball end is in the operating position in said chamber;

said retainer blocking rotation of said ball end in said chamber from the operating position.

7. An apparatus as set forth in claim 6 wherein said socket is rigid and is formed as one piece and wherein said ball end is rigid and is formed as one piece.

8. An apparatus as set forth in claim 6 wherein said portions on said socket for blocking rotation of said ball end about said first axis during movement of said ball end into said chamber comprise planar guide surfaces on said socket which are engageable with planar surfaces on said ball end for blocking rotation of said ball end relative to said socket while said ball end is moving into said chamber, said guide surfaces on said socket being disengageable from said planar surfaces on said ball end upon movement of said ball end into said chamber to enable rotation of said ball end relative to said socket to the operating position in said chamber.

9. An apparatus as set forth in claim 6 wherein said ball end has a spherical outer bearing surface with a diameter, said portions on said socket engageable with said ball end for blocking movement of said ball end out of said chamber when said ball end is in the operating position comprising a plurality of lips on said socket which are spaced apart by a distance which is less than the diameter of said ball end, said lips blocking movement of said ball end out of said chamber in said first direction and in a second direction opposite to said first direction when said ball end is in the operating position in said chamber.

10. An apparatus as set forth in claim 9 wherein said lips at least partially define an insertion channel through which said ball end is movable in said first direction into said chamber;

said insertion channel being angularly offset from said retainer opening by a predetermined number of degrees;

said ball end rotating by said predetermined number of degrees in said chamber to the operating position;

said retainer moving from the deflected condition to the free condition during rotation of said ball end in said chamber to the operating position.

11. A ball and socket joint comprising:

a socket having generally spherical first inner surfaces defining a chamber, said socket having second inner surfaces defining a channel leading radially into said chamber from a location outside of said socket;

a ball stud including a ball end, said ball end having spherical first outer surfaces generally matching said spherical first inner surfaces of said socket, said ball end having second outer surfaces generally matching said second inner surfaces of said socket, whereby said ball stud may be inserted into said socket through said channel and may rotate in a first direction of rotation such that said spherical first outer surfaces of said ball end are received within said spherical first inner surfaces of said chamber;

resilient biasing means for biasing said ball end for rotation in said first direction of rotation upon insertion of said ball end into said channel such that said ball end is automatically engaged in said socket upon insertion of said ball end into said channel.

12. A ball and socket joint as set forth in claim 11 wherein said socket is rigid and is formed as one piece and wherein said ball end is rigid and is formed as one piece.

13. A method of assembling a ball and socket joint, said method including the steps of:

providing a socket having a chamber;

providing a ball stud including a shank and a ball end fixed for movement with the shank;

moving the ball end of the ball stud in a first direction into the chamber, said moving step including blocking rotation of the ball end about a first axis during movement of the ball end into the chamber;

rotating the ball end about the first axis into an operating position in the chamber in which the ball end is rotatable in the chamber about second and third axes extending transverse to the first axis; and blocking movement of the ball end out of the chamber in a second direction opposite to the first direction when the ball end is in the operating position in the chamber;

said step of providing a ball stud including the step of providing a retainer connected for movement with the shank of the ball stud, the retainer having a free condition and being resiliently deflectable into a deflected condition;

said step of moving the ball end of the ball stud in a first direction into the chamber including the step of deflecting the retainer from the free condition into the deflected condition and into the retainer opening in the socket; and said step of rotating the ball end about the first axis into an operating position in the chamber including the step of returning the retainer on the ball stud from the deflected condition to the free condition during rotation of the ball end to the operating position.

14. A method as set forth in claim 13 wherein:

said step of providing a socket includes providing a socket wall having an insertion channel through which the ball end is movable in the first direction into the chamber, the insertion channel being angularly offset from the retainer opening by a predetermined number of degrees; and said step of rotating the ball end about the first axis into an operating position in the chamber includes (i) rotating the ball end in the chamber by the predetermined number of degrees to the operating position and (ii) returning the retainer on the ball stud from the deflected condition to the free condition during rotation of the ball end to the operating position.

* * * * *